Jan. 12, 1965    SHOJI KOBAYASHI    3,164,864
METALLIC MOLD FOR FORMING A SHAPED ARTICLE
Filed March 20, 1963    3 Sheets-Sheet 1
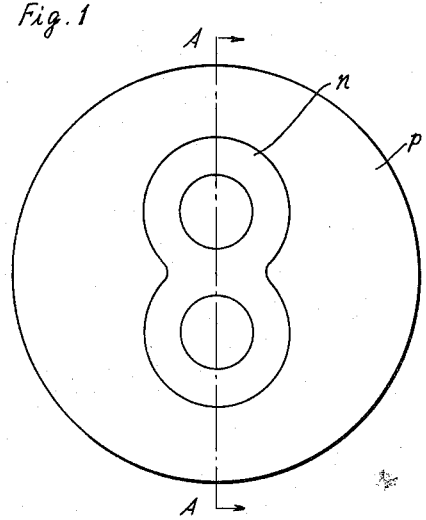
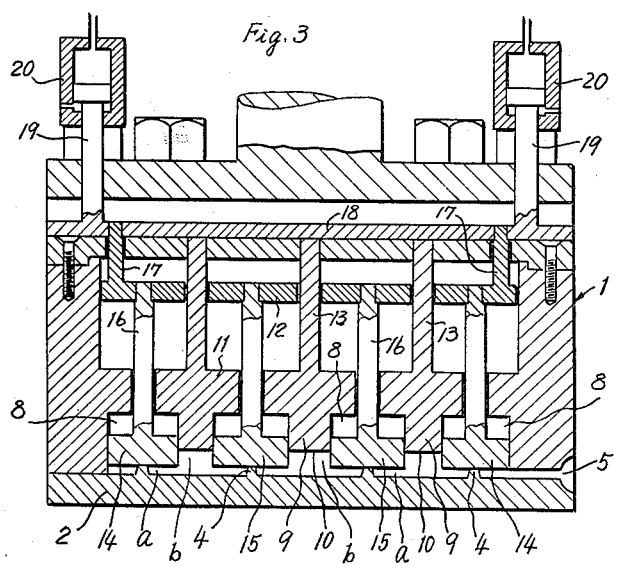
INVENTOR.
SHOJI KOBAYASHI United States Patent Office 3,164,864
Patented Jan. 12, 1965

3,164,864
METALLIC MOLD FOR FORMING A
SHAPED ARTICLE
Shoji Kobayashi, 1405 Oaza Ryoke, Urawa,
Saitama Prefecture, Japan
Filed Mar. 20, 1963, Ser. No. 266,532
Claims priority, application Japan, Apr. 27, 1962,
37/16,658
3 Claims. (Cl. 18—42)

This invention relates to a metallic mold for forming a shaped article.

Conventionally, in the injection molding of two materials different in quality, e.g., in the two color-injection molding for the production of dials for telephones or keys for typewriters, desired molded articles have been finished by first molding a first color with a first mold (first step), releasing the resulting first-step shaped article from the mold, inserting the same in a second mold to adjust it thereto, and then injecting a second color. Accordingly, in releasing the first-step shaped article from the mold after the completion of the first step, the material suffers from shrinkage or damage and tends to be deformed, particularly at portions different in thickness. Moreover, not only is a long time required in inserting and adjusting the shaped article to the second mold but the operation is lacking in accuracy, resulting in a high percentage off-grade products or rejects. In addition to these drawbacks, the conventional injection molding is too inefficient to be adaptable to automatic molding.

This invention relates to a metallic mold for injection molding which obviates the aforesaid drawbacks of conventional molding. A basic structure and an object of the present invention are as follows: Namely, in accordance with the present invention, one male mold is provided with two female molds, i.e., one for the first step and the other for the second step, wherein the female mold for the first step has, at suitable positions, several small projections which form gates for the second step and, into the male mold, a suitable number of vertically movable plungers are separately inserted. When the invention metallic mold is employed, the second step, after the completion of the first step, may be carried out while allowing the first-step shaped article to remain as it is in the male mold, without releasing the article therefrom, whereby not only does the first-step shaped article not suffer from deformation, shrinkage or damage but no difficulty is encountered, in the second step, in inserting and adjusting said article to the second mold. Thus the molding can be carried out efficiently. Moreover, in said first step, the gates for the second step are formed at the necessary or desirable locations so as to carry out the second step in succession, thereby completing the molding to form a final shaped article. The instant mold is so devised that the finished article can be ejected by means of the plungers, for release from the mold. Therefore, the application of the present metallic mold to suitable automatic injection molding apparatuses has made it possible to produce automatically two-color shaped articles with high efficiency.

For an understanding of the principles of the present invention, reference is made to the following description of a typical embodiment thereof as illustrated in the accompanying drawings.

In the drawings:

FIG. 1 is a plan view of a two-color molded article in the form of a typewriter key having the number "8" molded thereinto;

FIG. 2 is a sectional view taken on the line A—A of FIG. 1;

FIG. 3 is a transverse sectional view of a mold assembly for performing the first step of the method;

The metallic mold for shaping the key shown in the above drawings is composed of a single male mold 1, a first-step female mold 2 for shaping the first color, numeral 8, and the second-step female mold 3 for molding the second color, ground p.

Figure 6:
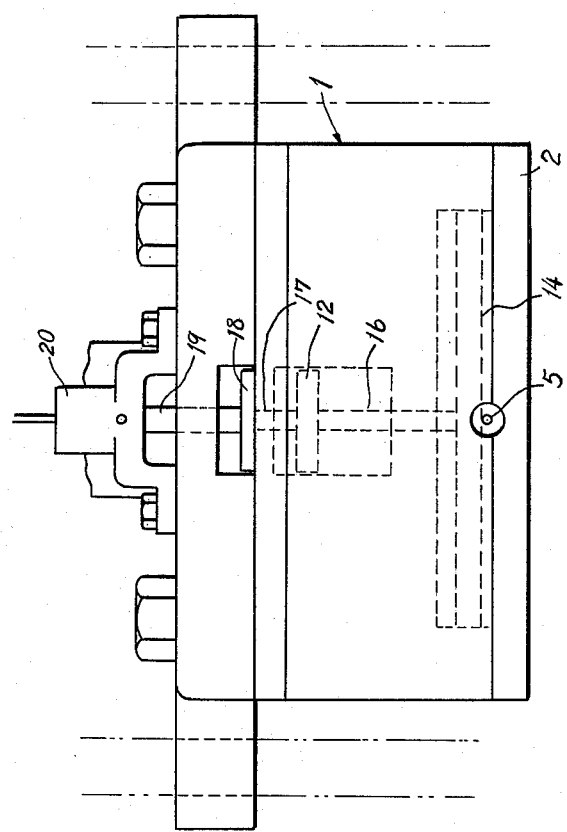
FIG. 6 is a right side elevation view of the mold corresponding to FIG. 3.

The above-mentioned first-step female mold 2 is provided with several small projections 4, which form the gates c for the second step, at suitable locations facing the interior of the male mold 1 placed thereon (said suitable locations being below the centers of the movable plungers 14 and 15, as will be mentioned later). In the mold shown in the drawings, 4 small projections 4 are provided; 2 in the numeral 8, and 2 in the ground. The injection gate 5 for the first step, shown in FIGS. 3 and 6, is located at the periphery of the superposed surfaces of the male and female molds.

On the upper surface of the female mold 3 for the second step, a cavity 6, corresponding in size to the interior molding surface of the male mold 1 is provided and, at the center of said cavity, a main gate 7 is provided so that a resin material is injected from the lower surface of mold element 3.

Within the lower part of the male mold 1, an intermediate horizontal partition 11 is provided, from the lower surface of which protrusions or projections 9, which form the shape of the numeral 8, extend in parallel relation. The end surfaces 10 of the projections 9 are so arranged as to form a clearance at a given distance from the upper surface of the female molds 2 and 3. Between projections 9, cavities 8 are provided to form the ground p. Vertically displaceable plungers 14 and 15 are positioned in the cavities 8 and have stems 16 extending through apertures in partition 11. The upper ends of these stems are connected to a guiding plate 12 positioned in mold 1 above partition 11. The guide plate 12, having the connecting rods 17 on each end, is connected by means of these connecting rods 17 to a suspending plate 18 extending transversely of the male mold. The suspending plate 18 is joined with piston rods 19 at each end, and is connected through rods 19 to the pistons of oil pressure cylinders 20. The aforesaid guide plate 12 is apertured for passage of guide rods 13 therethrough. These guide rods are integral with and extend upwardly from partition 11. Guide rods 13 serve to guide plate 12 during vertical motion of the guide plate, which vertical motion vertically displaces the plungers 13 and 15. Vertical motion of plate 12 is effected by piston rods 19 of the oil pressure cylinders 20 through the medium of plate 18 and connecting rods 17. In place of utilizing oil or hydraulic fluid pressure cylinders to effect vertical displacement, relative strong springs may be used.

The present metallic mold shown in the aforesaid drawings is employed in the manner described below: For the molding of the first color, the male mold 1 is first fitted with the first-step female mold 2 and tightened as shown in FIG. 3. Plate 18 is then moved downwardly through the action of the oil cylinders 20 so that plungers 14 and 15, connected to plate 18 through guide plate 12 and pins 17, are moved downwardly. Consequently, the small projections 4 on the upper surface of the female mold 2 are brought into contact with the lower surfaces of the plungers 14 and 15 to form therebetween the clearance a corresponding to the height of said small projections 4.

Further, the end surfaces 10 of the downwardly extending projections 9 for forming the letter are located at positions somewhat higher than the lower surfaces of the plungers 14 and 15 so as to form, under these end surfaces, the clearances $b$ which shape the letter. A resin material of a first color then is injected through the side gate 5 into the thus assembled mold to carry out the first color molding of the first-step female mold 2 disconnected from male mold 1 with the first-color formed article remaining in position in male mold 1. Further, since holes are formed in said first step molded article after the removal of the first step female mold, at positions where the small projections have been located, the holes are utilized as the gates $c$ for the second color-molding of the second step.

Figure 4:
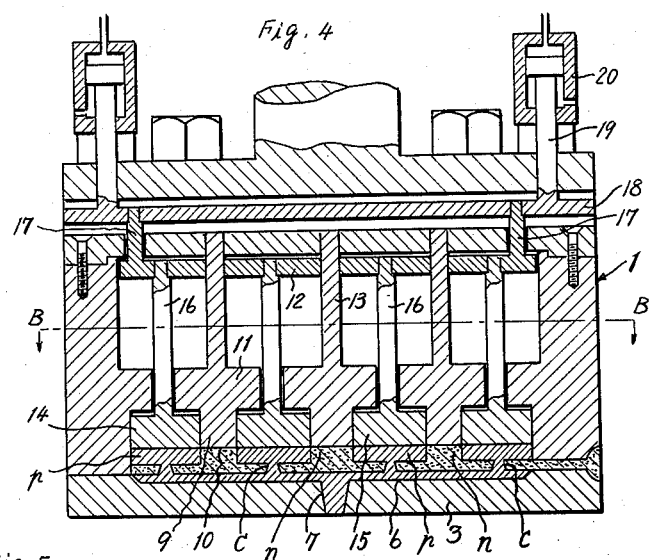
FIG. 4 is a view, similar to FIG. 3, illustrating the mold assembly during performance of the second step of the method.
Figure 5:
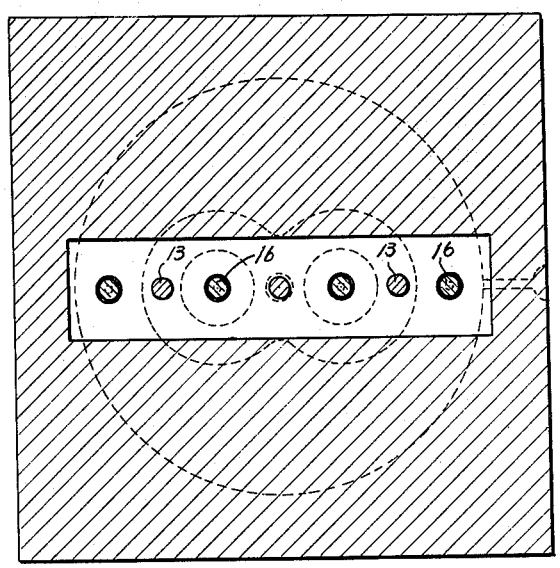
FIG. 5 is a horizontal sectional view taken along the line B—B of FIG. 4.

In the second step, the second step-female mold 3 is secured to the lower surface of the male mold 1, as shown in FIG. 4. That is to say, the second step female mold is placed in engagement with the lower surface of the first-step shaped article. By action of the oil pressure cylinders, as in the first step, the movable plungers 14 and 15 are elevated to a height at which the lower end surfaces of plungers 14 and 15 are coplanar with the end surfaces 10 of the projections 9 used for forming the letter or numeral. Thus a clearance corresponding to the ground $p$ is formed, embracing the first-step molded article between male mold 1 and female mold 3, and beneath the end surfaces of plungers 14 and 15. Also, another clearance corresponding to the cavity of the female mold 3, is formed below the first-step shaped article. These clearances are connected with each other by the gates $c$ and therefore, when a material for the second color molding is injected through the main gate 7, the injected material is charged into the cavity 6 of the female mold 3 and then into the clearance below the movable plungers through the gates $c$. Therefore, the second color-materal is charged in engagement with both upper and lower surfaces of the first color shaped article, while maintaining the latter in its position, whereby the molding of the two color-shaped article is complete. Therefore, when the female mold 3 is removed and the movable plungers, which have been elevated, are lowered after the completion of the second step, the shaped article, which has finished two color molding, is ejected from the male mold 1, whereby the desired product is obtained. Further, when said second step is completed, the female mold 2 for the first step is fitted again to the male mold 1 and the aforesaid operations are repeated to mold two-color shaped articles, simply, accurately and efficiently. As mentioned above, in accordance with the present invention, shaped articles having two colors or consisting of two different materials can be produced on far larger scale and at far lower cost than those of the conventional articles of this kind. Furthermore, the present mold provides products excellent in quality, and which have not been deformed, shrunk nor damaged, and never forms off-grade products. Thus, the present invention is applicable with markedly high efficiency to the molding of dials for telephone and keys for typewriters.

What I claim is:

1. Two-step molding apparatus comprising, in combination, an upper mold including side walls and a partition extending transversely between said side walls with the latter having portions extending beyond said partition to terminate in a parting plane; said partition having projections extending therefrom toward said parting plane and having substantially flat outer end surfaces arranged in a common plane substantially parallel to said parting plane; plural plungers having stems slidably engaged through apertures in said partition and heads on their outer ends closing the space between said partition and between said side walls and said partitions, said heads having substantially flat outer end surfaces lying in a common plane parallel to said parting plane; said substantially flat outer end surfaces of said projections and said head, together with said side walls, defining an open mold cavity; first and second lower molds interchangeably cooperable with said upper mold at said parting plane to close said mold cavity; said first lower mold having a substantially planar inner surface formed with projecting bosses each alignable with a respective plunger and having ends terminating in a common plane intermediate said parting plane and the common plane of the outer end surfaces of said projections; said upper mold and said first lower mold cooperatively defining an injection gate in said parting plane for injection of the first molding material in a first molding step; said second lower mold having a cavity in its inner surface extending outwardly from said parting plane and an injection gate opening into said cavity substantially perpendicular to said parting plane for injection of a second molding material in a second molding step.

2. Two-step molding apparatus, as claimed in claim 1, including means interconnecting said plungers for conjoint displacement, relative to said partition, between a first position in which the outer end surfaces of the plunger heads are engaged with said bosses during said first molding step and a second position in which the outer end surfaces of said plunger heads are coplanar with the outer end surfaces of said projections in the second molding step; said bosses forming gates through the first molding material for passage of the second molding material into the space between the inner surface of the first molding material and the outer end surfaces of said plunger heads during the second molding step.

3. Two-step molding apparatus, as claimed in claim 2, in which the means interconnecting said plungers comprises a plate secured to the plunger stems on the opposite side of said partition from the plunger heads; said partition being formed with elongated rectilinear projections extending through apertures in said plate for accurate guiding thereof during said conjoint displacement of said plungers.

References Cited in the file of this patent

UNITED STATES PATENTS

| 2,337,550 | Crosby | Dec. 28, 1943 |
| 3,049,759 | Eberhardt | Aug. 21, 1962 |
| 3,086,245 | Gits | Apr. 23, 1963 |

FOREIGN PATENTS

| 270,555 | Switzerland | Dec. 1, 1950 |